(12) United States Patent
Patterson et al.

(10) Patent No.: US 6,427,435 B1
(45) Date of Patent: Aug. 6, 2002

(54) RETAINER SEGMENT FOR SWIRLER ASSEMBLY

(75) Inventors: David Bruce Patterson, Mason; Thomas Anthony Leen, Cincinnati, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/575,415

(22) Filed: May 20, 2000

(51) Int. Cl.$^7$ ................................................. F23R 3/14
(52) U.S. Cl. ........................................ 60/39.32; 60/748
(58) Field of Search ........................... 60/39.31, 39.32, 60/748; 411/531, 542

(56) References Cited

U.S. PATENT DOCUMENTS

| | | | |
|---|---|---|---|
| 3,853,273 A | * 12/1974 | Bahr et al. ..................... | 60/748 |
| 5,117,637 A | * 6/1992 | Howell et al. ................. | 60/748 |
| 5,399,053 A | * 3/1995 | Duran ........................... | 411/353 |

* cited by examiner

Primary Examiner—Louis J. Casaregola
(74) Attorney, Agent, or Firm—William Scott Andes; Pierce Atwood

(57) ABSTRACT

A retainer segment is provided for a swirler assembly having first and second members, such as a primary and secondary swirler or a swirler body and floating ferrule, disposed in sliding engagement with each other. The two members are maintained in sliding engagement by two of the retainer segments which are joined to the second member and engage the first member. Each retainer segment is an arcuate member defining inner and outer curved edges and first and second ends. Each end has a concave cutout formed therein to reduce weld joint and bending stresses that occur from the forced vibration of the retainer segments.

11 Claims, 3 Drawing Sheets

RETAINER SEGMENT FOR SWIRLER ASSEMBLY

BACKGROUND OF THE INVENTION

This invention relates generally to gas turbine engines and more particularly to swirler assemblies for supplying compressed air to the combustor of such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Fuel is typically supplied to the combustor through a plurality of fuel nozzles positioned at one end of the combustion zone. The air is supplied through surrounding assemblies, known as swirler assemblies, which impart a swirling motion to the air so as to cause the air and fuel to be thoroughly mixed. The swirler assemblies are mounted in a dome plate that is joined to the upstream ends of the combustor's inner and outer liners, and each fuel nozzle tip is received in a corresponding one of the swirler assemblies.

The swirler assemblies have to endure vibratory stresses due to fluctuating flows and pressures of the air stream that exits the compressor. The vibrations cause alternating stresses in combustor components and can lead to high cycle fatigue failures in parts that are not otherwise highly stressed from thermal or pressure loading. One conventional swirler assembly comprises a primary swirler and a separate secondary swirler. The primary swirler has a plurality of circumferentially spaced swirl vanes or air passages. The vanes or passages are angled with respect to the axial centerline of the swirler assembly so as to impart a swirling motion to the airflow. The secondary swirler also has a plurality of circumferentially spaced swirl vanes or air passages. The vanes or passages of the secondary swirler are angled so as to produce a swirl of air swirling in the same or opposite direction as the primary swirler to further promote fuel-air mixing. The primary swirler is disposed in sliding engagement with the secondary swirler, which is fixedly mounted to the dome plate. This arrangement allows the primary swirler to receive the fuel nozzle and accommodate relative motion between the fuel nozzle and the dome plate.

A retainer fits over the primary swirler and is welded to the secondary swirler to retain the two swirlers in engagement with one another. One type of retainer is stamped out of sheet metal into a circular annulus. However, the airflow through the vanes or passages of the primary swirler creates a reaction force that tends to cause the primary swirler to rotate with respect to the secondary swirler and the fuel nozzle. If allowed to rotate, the primary swirler would fail to impart the necessary level of swirling to the air, and effective mixing of the air and fuel would not be achieved. Furthermore, rotation of the primary swirler could cause excessive wear to the fuel nozzle tip. Primary swirler rotation is thus prevented in conventional swirler assemblies by providing at least one outwardly extending tab on the primary swirler that engages a stationary structure on the secondary swirler so as to limit relative rotation of the swirlers.

In combustors with swirler assemblies that are relatively closely spaced, two anti-rotation tabs can be used for each swirler assembly. The use of two anti-rotation tabs provides more contact area than single tab arrangements and thereby reduces wear. To accommodate swirler assemblies with two anti-rotation tabs, the annular, single piece retainer is replaced with a pair of retainer segments. The retainer segments are each less than 180 degrees in length and are welded to the secondary swirler in a cantilevered fashion. Retainer segments are subject to weld joint cracking due to non-uniform pressure flow variations that cause vibratory excitation of the retainer segments. Most typically, such cracking initiates in the ends of the retainer segments. Failed retainer segments can cause unscheduled engine removals to retrieve primary swirlers that become free when fuel nozzle maintenance is performed.

Accordingly, there is a need for an improved swirler assembly having more durable retainer segments.

BRIEF SUMMARY OF THE INVENTION

The above-mentioned need is met by the present invention that provides a swirler assembly having first and second members disposed in sliding engagement with each other. The two members are maintained in sliding engagement by one or more retainer segments joined to the second member and engaging the first member. The retainer segment is an arcuate member defining inner and outer curved edges and first and second ends. Each end has a concave cutout formed therein to reduce weld joint and bending stresses that occur from the forced vibration of the retainer segment.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
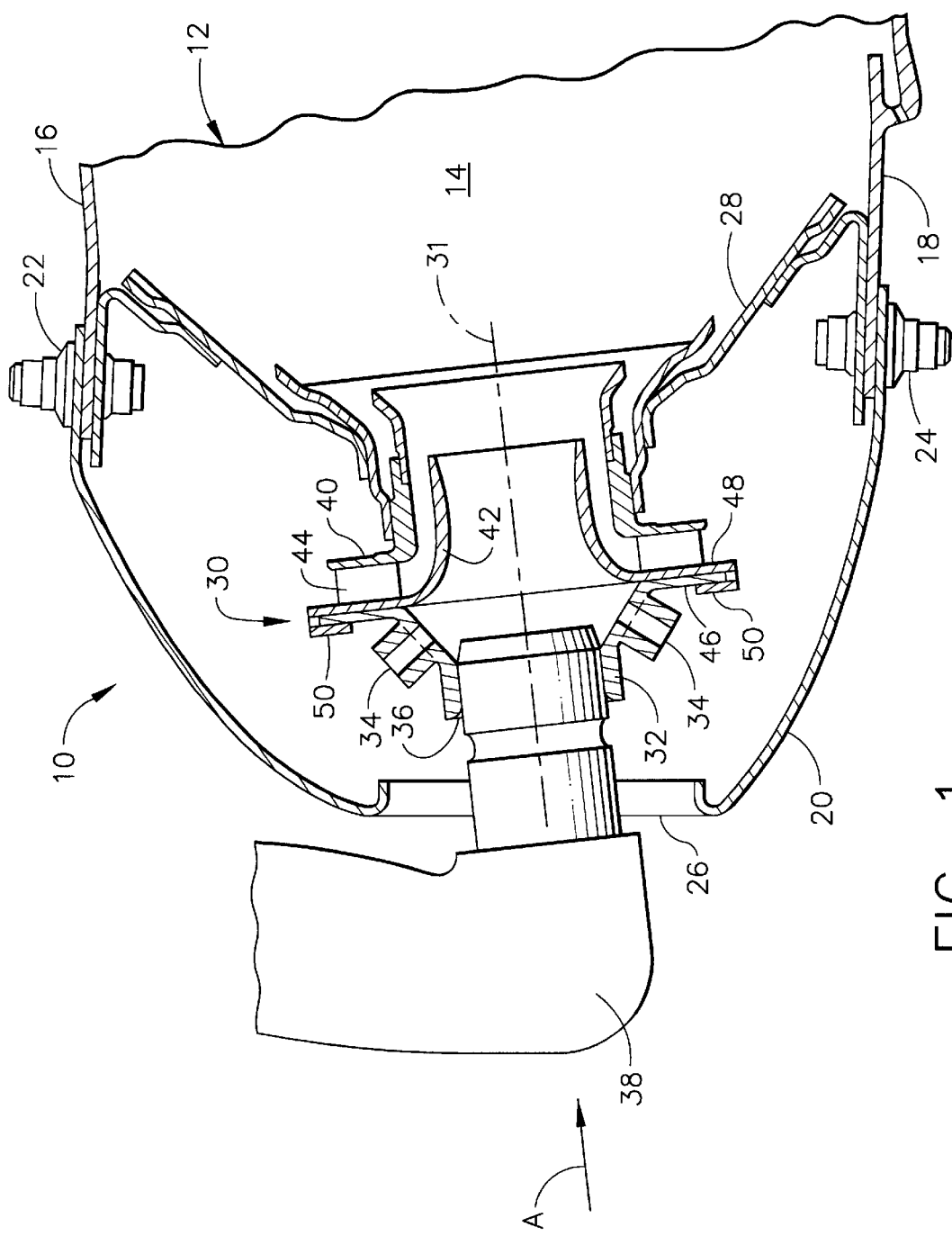
FIG. 1 is an axial sectional view of the forward portion of combustor illustrating one embodiment of a swirler assembly.

Referring to the drawings wherein identical reference numerals denote the same elements throughout the various views. FIG. 1 shows the forward end of a combustor 10 of the type suitable for use in a gas turbine engine and including a hollow body 12 defining a combustion chamber 14 therein. The hollow body 12 is generally annular in form and is defined by an outer liner 16 and an inner liner 18. The upstream end of the hollow body 12 is substantially closed off by a cowl 20 attached to the outer liner 16 by a first fastener 22 and to the inner liner 18 by a second fastener 24. At least one opening 26 is formed in the cowl 20 for the introduction of fuel and compressed air. The compressed air is introduced into the combustor 10 from a compressor (not shown) in a direction generally indicated by arrow A of FIG. 1. The compressed air passes primarily through the opening 26 to support combustion and partially into the region surrounding the hollow body 12 where it is used to cool both the liners 16, 18 and turbomachinery further downstream.

Disposed between and interconnecting the outer and inner liners 16, 18 near their upstream ends is an annular dome plate 28. A plurality of circumferentially spaced swirler assemblies 30 (only one shown in FIG. 1) is mounted in the dome plate 28. Each swirler assembly 30 includes a primary swirler 32 that comprises a plurality of angularly directed passages 34. The passages 34 are angled with respect to the axial centerline 31 of the swirler assembly 30 so as to impart a swirling motion to the airflow. The primary swirler 32 also has an integral ferrule 36 that coaxially receives a fuel nozzle 38.

The swirler assembly 30 further includes a secondary swirler 40 that adjoins the primary swirler 32, downstream thereof, and is fixedly received in the dome plate 28. The secondary swirler 40 includes a venturi 42 and a plurality of circumferentially spaced swirl vanes 44 disposed coaxially about the venturi 42. The venturi 42 and the ferrule 36 of the primary swirler 32 are both coaxially aligned with the axial centerline 31 of the swirler assembly 30. Air from the opening 26 passes through the passages 34. The swirling air exiting the passages 34 interacts with fuel injected from the fuel nozzle 38 so as to mix as it passes into the venturi 42. The secondary swirl vanes 44 then act to present a swirl of air swirling in the opposite direction that interacts with the fuel/air mixture so as to further atomize the mixture and prepare it for combustion in the combustion chamber 14. It should be noted that although FIG. 1 illustrates the swirler assembly of the present invention in a single annular combustor, the present invention is equally applicable to other types of combustors, including multi-annular combustors. It should also be noted that the present invention is applicable to co-rotating swirler assemblies in addition to the counter-rotating swirler assembly described above.

The primary swirler 32 comprises a base section 46 having the ferrule 36 formed on the forward side thereof. The aft side base section 46 defines a downstream-facing planar surface. The secondary swirler 40 comprises a base section 48 that defines an upstream-facing planar surface that slidingly engages the planar surface of the primary swirler 32 when the swirler assembly 30 is assembled. The venturi 42 extends axially (with respect to the axial centerline 31 of the swirler assembly 30) downstream from the secondary base section 48 and, as mentioned above, the swirl vanes 44 are disposed coaxially about the venturi 42.

The primary and secondary swirlers 32 and 40 are maintained in sliding engagement by two retainer segments 50 that are joined to the secondary swirler 40 on opposite sides of the venturi 42 from one another. Specifically, the retainer segments 50 are joined (preferably by welding) to the upstream-facing planar surface of the secondary base section 48 and engage the base section 46 of the primary swirler 32. The retainer segments 50 are located so as to prevent relative axial movement of the two swirlers 32 and 40 but permit limited lateral movement of the primary swirler 32 with respect to the secondary swirler 40. This arrangement allows the primary swirler 32 to float or move laterally so that the ferrule 36 can be coaxially aligned with, and receive, the fuel nozzle 38, but otherwise prevents the two swirlers 32 and 40 from becoming disengaged while the swirler assembly 30 is being installed in the engine. The floating primary swirler 32 also accommodates relative motion between the fuel nozzle 38 and the dome plate 28 during engine operation.

Figure 2:
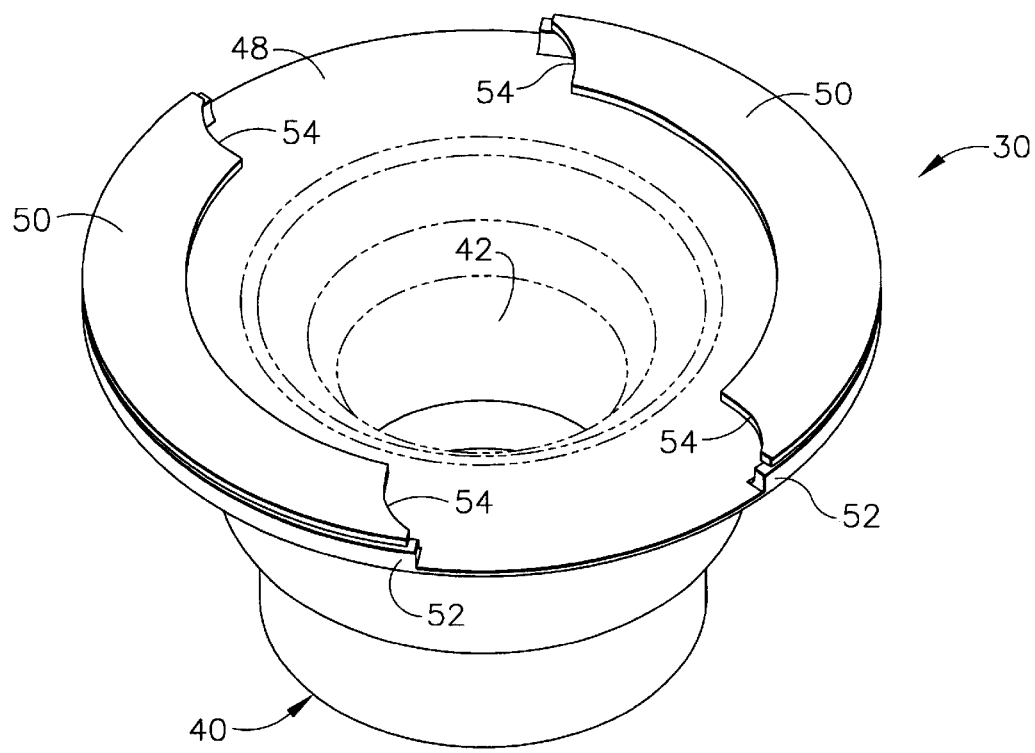
FIG. 2 is a perspective view of the swirler assembly of FIG. 1 with the primary swirler removed.

Referring now to FIG. 2, which shows the swirler assembly 30 with the primary swirler 32 removed, it is seen that the retainer segments 50 are arcuate members having relatively narrow widths. Each retainer segment 50 defines an arc that is less than 180 degrees and has radially (with respect to the swirler centerline 31) inner and outer edges that define parallel curves. The radius of curvature of the outer edges closely matches the radius of curvature defined by the base section 48 of the secondary swirler 40. Each retainer segment 50 is joined in a cantilevered fashion to a corresponding one of two curved, axially extending ridges 52 that are formed on the upstream-facing planar surface of the secondary base section 48. The ridges 52 are situated along the perimeter of the upstream-facing planar surface and are located on opposite sides of the venturi 42 from one another. The retainer segments 50 are positioned so that their outer edges are substantially flush with the outer edge of the secondary base section 48.

Figure 3:
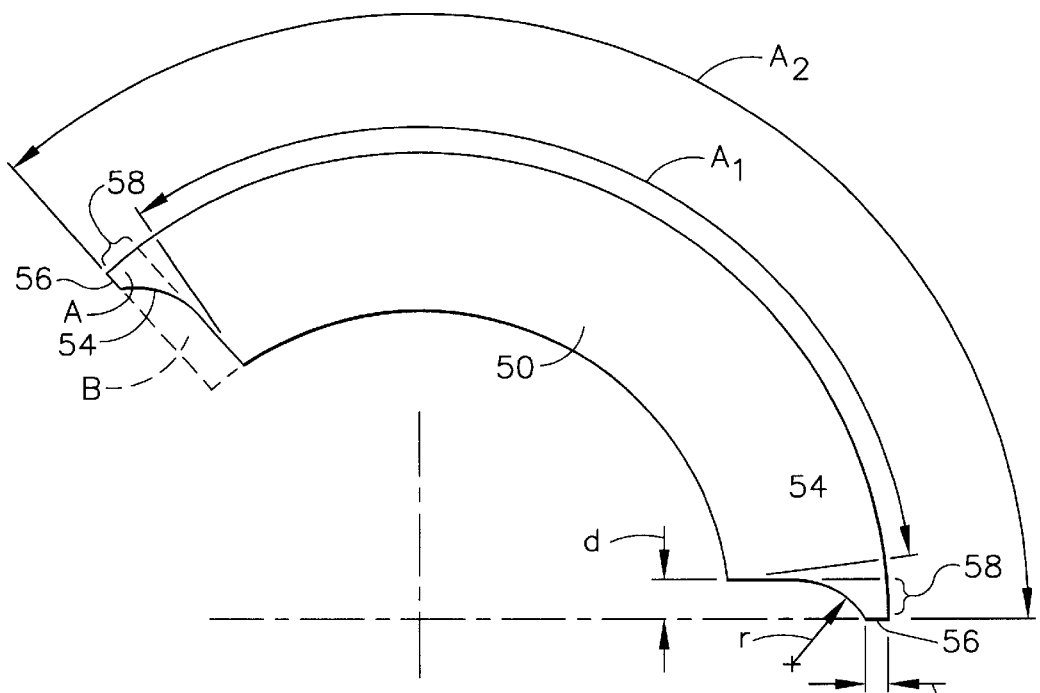
FIG. 3 is a plan view of a retainer segment of FIG. 2.

The retainer segments 50 are provided with scalloped ends. That is, each end has a concave cutout 54 formed therein such that the inner edge of the retainer segment 50 defines an arc $A_1$ that is less than the arc $A_2$ defined by the outer edge, as seen in FIG. 3. In one preferred geometry, each cutout 54 has a curved portion and a straight portion adjacent to the inner edge and defines a tip 56 at the outer corner of the retainer segments 50. The width w of the tips 56 is preferably equal to the width of the ridges 52 on the secondary swirler 40. The scalloped ends reduce the weld joint and bending stresses that occur from the forced vibration of the cantilevered retainer segments 50. The curved cutouts 54 also reduce the stress concentration factor at the corners of the retainer segments 50, which is where most cracks historically initiate in conventional retainer segments. The scalloped ends also alter the resonant frequency of the retainer segments 50 slightly, which may have a positive impact on the weld joint and bending stresses.

The size of the concave cutouts 54 should be large enough to adequately alleviate the weld joint and bending stresses. Preferably, the cutouts 54 are sized so as to define an end region 58 (i.e., the portion of the retainer segment 50 in which the cutout 54 is formed) that defines an area A (FIG. 3) which is less than the area B defined by the cutout 54. In one preferred embodiment, the retainer segment 50 is sized such that the outer edge has a radius of curvature of about 3.2 centimeters and the inner edge has a radius of curvature of about 2.4 centimeters. Each tip 56 has a width w of about 0.1 centimeters. Each concave cutout 54 has a depth d of about 0.25 centimeters and a curved portion defining a radius r of about 0.5 centimeters.

The smaller retainer end regions 58 improves the weld prep for welding the retainer segments 50 to the ridges 52. Because less material is present at the end regions 58, the material is "consumed" better during welding. The weld joint is thus generally stronger at the ends and lacks discontinuities or crack starters. This strengthens the joint at the end regions, which, as mentioned above, is where cracks usually occur in conventional retainer segments. Preferably, the weld joint is a 100% penetration weld along the entire length of the retainer segments 50, as opposed to the approximately 70% penetration weld commonly used with conventional retainer segments.

The retainer segments 50 are preferably made of a high temperature alloy suited for use in the turbine section of a gas turbine engine, such as nickel-base or cobalt-base alloys. One commercially available material that is particularly preferred because of its resistance to high cycle fatigue is the nickel-base alloy Hastalloy X. The thickness of the retainer segments 50 will be determined by the application and should be such that the resonant frequency of the retainer segments 50 is out of the operating frequency range of the engine. Typically, the retainer segments 50 will be somewhat thicker than conventional retainer segments to add stiffness and strength.

Figure 4:
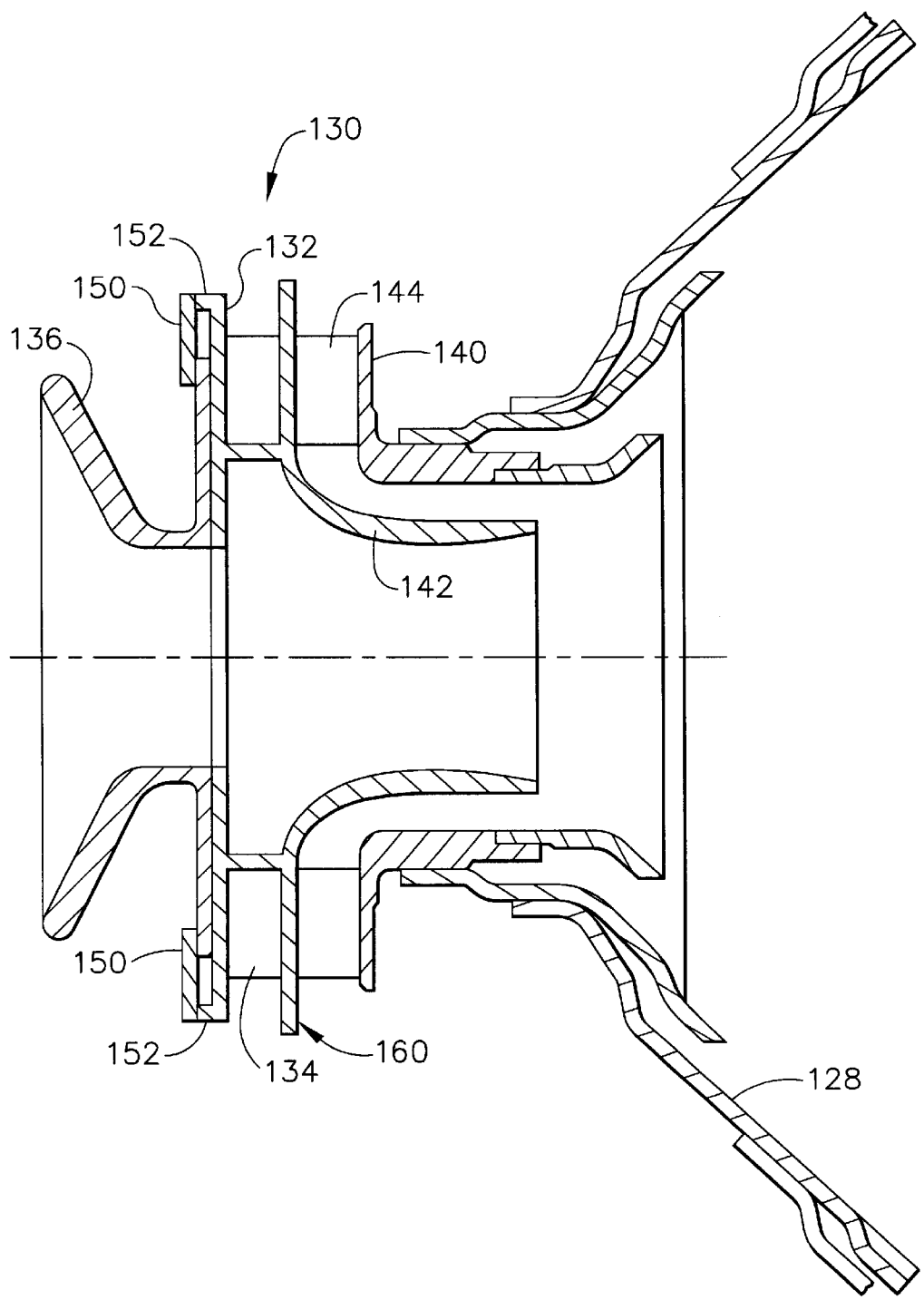
FIG. 4 is an axial sectional view illustrating an alternative embodiment of a swirler assembly.

FIG. 4 illustrates an alternative swirler assembly 130 in which a primary swirler 132 and a secondary swirler 140 are integrally formed as a unitary swirler body 160 that is fixedly received in a dome plate 128. The primary swirler 132 includes a first plurality of circumferentially spaced swirl vanes 134 disposed about a central opening, and the secondary swirler 140 includes a venturi 142 and a second plurality of circumferentially spaced swirl vanes 144 disposed coaxially about the venturi 142. As in the first embodiment, incoming air passing through the first swirl vanes 134 is swirled into the venturi 142. This swirling air interacts with fuel injected from a fuel nozzle (not shown in FIG. 4) so as to mix as it passes into the venturi 142. The secondary swirl vanes 144 then act to present a swirl of air swirling in the same or opposite direction that interacts with the fuel/air mixture so as to further atomize the mixture.

The swirler assembly 130 includes a separate ferrule 136 that is mounted to the forward end of the swirler body 160 to receive the fuel nozzle. The ferrule 136 includes a downstream-facing planar surface that slidingly engages an upstream-facing planar surface the swirler body 160. The ferrule 136 is maintained in sliding engagement with the swirler body 160 by two retainer segments 150 that are joined to the swirler body 160 on opposite sides thereof. Specifically, the retainer segments 150 are joined (preferably by welding) in a cantilevered fashion to two ridges 152 formed on the upstream-facing planar surface of the swirler body 160. The retainer segments 150 engage the ferrule 136 so as to prevent relative axial movement of the ferrule 136 and the swirler body 160 but permit limited lateral movement of the ferrule 136 with respect to the swirler body 160. This arrangement allows the ferrule 136 to float or move laterally so that it can receive the fuel nozzle, but otherwise prevents the ferrule 136 and the swirler body 160 from becoming disengaged while the swirler assembly 130 is being installed in the engine. The floating ferrule 136 also accommodates relative motion between the fuel nozzle and the dome plate 128 during engine operation.

The retainer segments 150 are the same as the retainer segments described above and shown in FIG. 3 in that they are curved pieces having scalloped ends. Each end has a concave cutout formed therein such that the inner edge of the retainer segment 150 defines an arc that is less than the arc defined by the outer edge. The scalloped ends reduce the weld joint and bending stresses that occur from the forced vibration of the cantilevered retainer segments 150 in the same manner as described above in connection with the first embodiment.

The foregoing has described an improved swirler assembly having more durable retainer segments. While specific embodiments of the present invention have been described, it will be apparent to those skilled in the art that various modifications thereto can be made without departing from the spirit and scope of the invention as defined in the appended claims.

What is claimed is:

1. A retainer segment for a swirler assembly in a gas turbine engine, said retainer segment comprising an arcuate member defining inner and outer curved edges and first and second ends, wherein each end has a concave cutout formed therein and wherein said inner edge defines a first arc and said outer edge defines a second arc, said first arc being smaller than said second arc.

2. The retainer segment of claim 1 wherein each end of said retainer segment has an end region that defines a first area and each cutout defines a second area, said first area being less than said second area.

3. A swirler assembly comprising:
   a first member;
   a second member disposed in sliding engagement with said first member; and
   at least one retainer segment joined to said second member and engaging said first member, wherein said retainer segment is an arcuate member defining inner and outer curved edges and first and second ends, and each end has a concave cutout formed therein.

4. The swirler assembly of claim 3 wherein said inner edge defines a first arc and said outer edge defines a second arc, said first arc being smaller than said second arc.

5. The swirler assembly of claim 3 wherein each end of said retainer segment has an end region that defines a first area and each cutout defines a second area, said first area being less than said second area.

6. The swirler assembly of claim 3 wherein said second member has a perimeter and a ridge formed thereon, along said perimeter, said retainer segment being welded to said ridge in a cantilevered fashion.

7. The swirler assembly of claim 6 wherein said retainer segment is welded to said ridge via a 100% penetration weld.

8. The swirler assembly of claim 3 further comprising a second retainer segment joined to said second member and engaging said first member, wherein said second retainer segment is an arcuate member defining inner and outer curved edges and first and second ends, and each end has a concave cutout formed therein.

9. The swirler assembly of claim 8 wherein said second retainer segment is located on an opposite side of said second member from said first-mentioned retainer segment.

10. The swirler assembly of claim 3 wherein said first member is a primary swirler and said second member is a secondary swirler.

11. The swirler assembly of claim 3 wherein said first member is a ferrule and said second member is a swirler body.

* * * * *